(12) United States Patent
Karaoguz

(10) Patent No.: US 9,083,664 B2
(45) Date of Patent: *Jul. 14, 2015

(54) SYSTEM AND METHOD FOR ACQUIRING AND/OR CONFIGURING A MOBILE PLATFORM TO PROVIDE A SUITE OF SERVICES

(71) Applicant: BROADCOM CORPORATION, Irvine, CA (US)

(72) Inventor: Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/319,658

(22) Filed: Jun. 30, 2014

(65) Prior Publication Data

US 2014/0308945 A1    Oct. 16, 2014

Related U.S. Application Data

(63) Continuation of application No. 12/891,136, filed on Sep. 27, 2010, now Pat. No. 8,782,180.

(60) Provisional application No. 61/248,540, filed on Oct. 5, 2009.

(51) Int. Cl.
*G06F 15/177* (2006.01)
*H04L 12/58* (2006.01)
*H04L 29/08* (2006.01)
*H04W 4/12* (2009.01)
*H04W 84/12* (2009.01)

(52) U.S. Cl.
CPC .............. *H04L 51/046* (2013.01); *H04L 67/14* (2013.01); *H04L 67/32* (2013.01); *H04W 4/12* (2013.01); *H04W 84/12* (2013.01)

(58) Field of Classification Search
USPC .................................. 709/220, 229; 455/418
See application file for complete search history.

(56) References Cited

U.S. PATENT DOCUMENTS 8,892,098 B2 * 11/2014 Choi ............................ 455/436

* cited by examiner

*Primary Examiner* — Amare F Tabor
(74) *Attorney, Agent, or Firm* — Garlick & Markison; Bruce E. Garlick

(57) ABSTRACT

A system and method for determining a service provider set of one or more service providers to provide a service suite of one or more services in a platform (e.g., a mobile device platform) and configuring such platform to utilize such service provider set to provide such service suite to a user, substantially as shown in and/or described in connection with at least one of the figures, as set forth more completely in the claims.

20 Claims, 4 Drawing Sheets

SYSTEM AND METHOD FOR ACQUIRING AND/OR CONFIGURING A MOBILE PLATFORM TO PROVIDE A SUITE OF SERVICES

CROSS-REFERENCE TO RELATED APPLICATIONS/INCORPORATION BY REFERENCE

The present U.S. Utility patent application claims priority pursuant to 35 U.S.C. §120 as a continuation of U.S. Utility application Ser. No. 12/891,136, entitled "System and Method for Acquiring and/or Configuring a Mobile Platform to Provide a Suite of Services," filed Sep. 27, 2010, which claims priority pursuant to 35 U.S.C. §119(e) to U.S. Provisional Application No. 61/248,540, entitled "Mobile Platform Service Auction and Configuration," filed Oct. 5, 2009, both of which are hereby incorporated herein by reference in their entirety and made part of the present U.S. Utility patent application for all purposes.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

A user of a platform (e.g., a mobile device platform) may desire to utilize different services during different respective timeframes. Such services may, for example, correspond to one or more different service providers, each with different respective corresponding platform operational requirements, and each with technical capabilities and business paradigms that change over time. Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for determining a service provider set of one or more service providers to provide a service suite of one or more user services in a platform (e.g., a mobile device platform) and configuring such platform to utilize such service provider set to provide such service suite to a user, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF VARIOUS ASPECTS OF THE INVENTION

Figure 1:
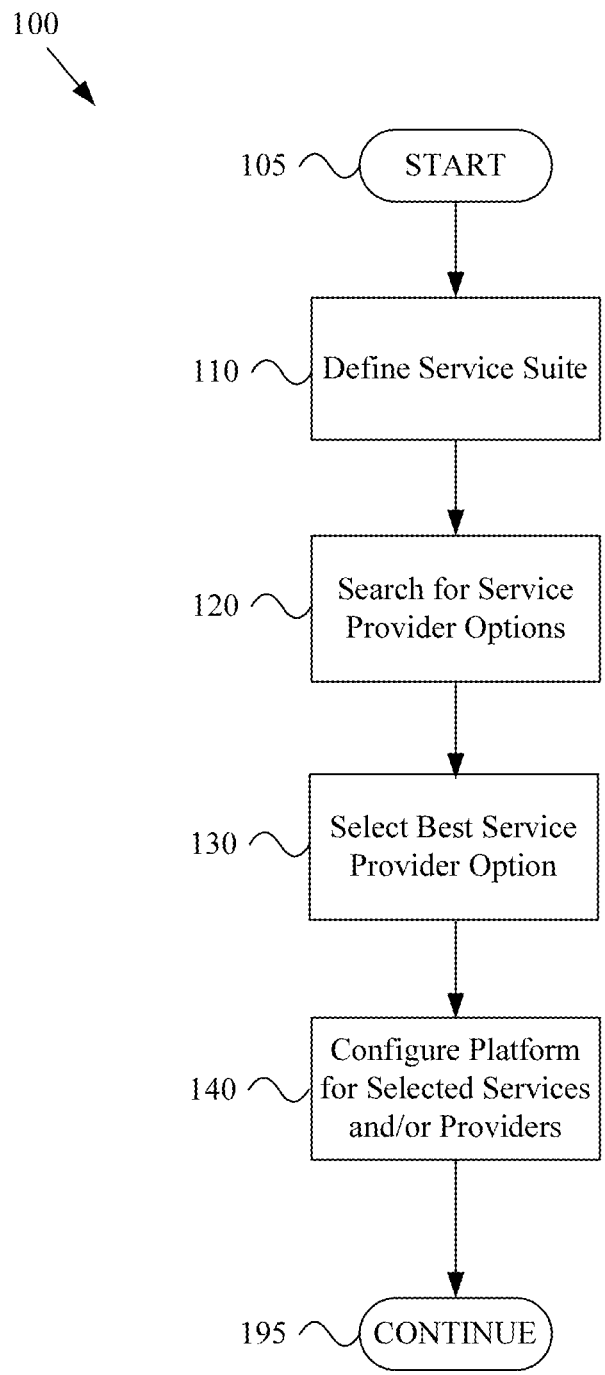
FIG. 1 is a flow diagram of a non-limiting exemplary method for determining services, determining service provider(s) and configuring a system to provide services, in accordance with various aspects of the present invention.

The following discussion will refer to various communication modules, components or circuits. Such modules, components or circuits may generally comprise hardware and/or a combination of hardware and software (e.g., including firmware). Such modules may also, for example, comprise a computer readable medium (e.g., a non-transitory medium) comprising instructions (e.g., software instructions) that, when executed by a processor, cause the processor to perform various functional aspects of the present invention. Accordingly, the scope of various aspects of the present invention should not be limited by characteristics of particular hardware and/or hardware/software implementations of a module, component or circuit unless explicitly claimed as such. For example and without limitation, various aspects of the present invention may be implemented by one or more processors (e.g., a microprocessor, digital signal processor, baseband processor, microcontroller, etc.) executing software instructions (e.g., stored in volatile and/or non-volatile memory). Also for example, various aspects of the present invention may be implemented by an application-specific integrated circuit ("ASIC") and/or other hardware components.

Additionally, the following discussion will refer to various system modules (e.g., modules of a service provider system, modules of a portable electronic device, etc.). It should be noted that the following discussion of such various modules is segmented into such modules for the sake of illustrative clarity. However, in actual implementation, the boundaries between various modules may be blurred. For example, any or all of the functional modules discussed herein may share various hardware and/or software components. For example, any or all of the functional modules discussed herein may be implemented wholly or in-part by a shared processor executing software instructions. Additionally, various software sub-modules that may be executed by one or more processors may be shared between various software modules. Accordingly, the scope of various aspects of the present invention should not be limited by arbitrary boundaries between various hardware and/or software components, unless explicitly claimed.

The following discussion may also refer to communication networks and various aspects thereof. For the following discussion, a communication network is generally the communication infrastructure through which a communication device (e.g., a portable communication device, a portable electronic device with network communication capability, a personal media system, a cellular telephone, a wireless LAN-enabled personal computing device, etc.) may communicate with other systems. For example and without limitation, a communication network may comprise a wired and/or wireless telecommunication system, a wired and/or wired local area network (WLAN), a cable and/or satellite television communication network, a cellular communication network, a wireless metropolitan area network (WMAN), a wireless personal area network (WPAN), any home or premises communication network, etc. A particular communication network may, for example, generally have a corresponding communication protocol according to which a communication device may communicate with the communication network. Unless so claimed, the scope of various aspects of the present invention should not be limited by characteristics of a particular type of communication network.

Various aspects of the present invention generally apply to mobile platforms (e.g., cellular telephones, portable email devices, personal digital assistants, hand held computers, laptop computers, notepad computers, portable music players, portable multimedia players, portable position devices, portable gaming device, any personal portable electronic device, etc., or any combination thereof. Note, however, that various aspects of the present invention may also, for example, apply to generally stationary devices (e.g., set top boxes, desktop computing systems, receivers, etc.) for which the operating environment may change over time.

A user's service needs may change from period to period (e.g., from day-to-day, week-to-week, etc.). Various aspects of the present invention provide for the platform to determine a suite of one or more services desired by the user immediately and/or in the future (e.g., the next day, set of days, the next general time period, an upcoming time window, while the user and/or portable electronic device is located in or near a particular geographical location, etc.).

The mobile platform may then (e.g., immediately, during a time period when the user is not utilizing mobile platform and/or communication bandwidth of the mobile platform) determine a best set of one or more service providers to provide the desired suite of services to the user. For example, the mobile platform may communicate through a communication network to one or more systems (e.g., service providers, service brokers, etc.) to ascertain a best set of one or more service providers to provide the desired suite of services to the user.

The mobile platform may then (e.g., automatically without additional user input or after interacting with a user of the mobile platform to determine service provider(s)) configure itself to provide such services to the user.

Thus, time period-by-time period (or location-by-location, or user-by-user), the mobile platform may flexibly adapt operation of the platform between service provider(s) and/or application(s) (e.g., telecommunication providers and/or applications, multimedia providers and/or applications, positioning providers and/or applications, Internet access providers and/or applications, etc.).

The following discussion will now provide non-limiting examples of various aspects of the present invention. Note that various aspects of the present invention should not be limited by characteristics of such non-limiting examples unless explicitly claimed.

Turning first to FIG. 1, such figure is a flow diagram of a non-limiting exemplary method 100 for determining services, determining service provider(s) and configuring a system to provide services, in accordance with various aspects of the present invention.

The exemplary method 100 may begin executing at step 105. The method 100 may begin executing in response to any of a variety of causes or conditions, non-limiting examples of which will now be provided. For example, the method 100 may begin executing in response to user initiation. For example, a user may (e.g., via a user interface of a personal portable electronic device) indicate a desire to specify a desired suite of one or more services desired by the user. Also for example, a user may indicate a desire to find another set of one or more service providers to provide a present (or previously defined) suite of services.

Also for example, the method 100 may begin executing in response to a detected change in operating environment. Such a detected change in environment may, for example, comprise detecting a change in location of the mobile platform (e.g., determining that the mobile platform is located outside of a presently defined operating area, determining that the mobile platform is presently located at a location for which a suite of services has not been defined, determining that the mobile platform is presently located at a location for which one or more suites of services have been previously defined but are not presently being provided, determining that the mobile platform is presently located in a region where the service provider demographic has recently changed, etc.). Such location determining may be performed in any of a variety of manners (e.g., via positioning functionality on-board the mobile platform, by detecting particular networks associated with particular geographical locations (e.g., airport communication networks, campus networks, any enterprise network associated with a particular area, cellular networks and/or base stations associated with a particular area, a home network, an office network, etc.), by detecting user input associated with a particular location, etc. Also for example, the method 100 may begin execution in response to determining that the mobile platform is being moved to a new location (e.g., by processing change in location versus time, by identifying a change in elevation (e.g., indicative of geographical location change, air travel, etc.), etc.

Additionally for example, the method 100 may begin executing in response to determining that utilization of the mobile platform has changed (e.g., changed relative to a particular threshold of use variance). For example, the method 100 may begin executing in response to determining that a particular service or plurality of services in a presently provided suite of services, have not been utilized (or being utilized an amount below a threshold). Such a change in utilization may, for example, indicate that the mobile platform is being utilized in a different geographical region, being utilized by a different person, being utilized by a user whose use characteristics have changed, etc.

Further for example, the method 100 may begin executing in response to a detected change in user of a mobile platform. Detecting such a change may, for example, comprise detecting a change in user when a different user logs into a mobile platform and/or a service provided to the user by the mobile platform (e.g., a media service, a virtual LAN service, a communication service, a location service, a navigation service, a travel service, an Internet access service, etc.).

The exemplary method 100 may begin execution automatically (e.g., without user interaction). Also for example, the method 100 may begin executing automatically and then solicit user input as to whether the method 100 should continue executing.

In general, the exemplary method 100 may begin executing in response to any of a variety of causes and/or conditions, including any of the previous examples and/or any combination thereof. Accordingly, the scope of various aspects of the present invention should not be limited by any characteristics of any particular causes or conditions unless explicitly claimed.

The exemplary method 100 may, at step 110, comprise determining a suite of services desired for the mobile platform (e.g., desired by a user of a portable electronic device). Step 110 may comprise determining a desired suite of services (i.e., a suite of one or more services) in any of a variety of manners, non-limiting examples of which will be presented below.

For example and without limitation, step 110 may comprise providing a user interface by which a user of the mobile platform may identify desired services. Such a user interface may comprise many characteristics. For example, such a user interface may comprise a graphical user interface utilizing a screen of a portable electronic device. Also for example, such a user interface may comprise a graphical user interface of a system separate from the portable electronic device (e.g., a system that may be communicatively coupled to the portable electronic device and/or utilized to configure the portable electronic device).

For example, step 110 may comprise presenting a list of services to a user for user selection of desired services. Such a list may, for example, comprise a list of all presently available services and/or all services that the mobile platform is capable of providing to a user. Such a list may, for example, comprise a list of services typically provided by the mobile platform and/or a list of services associated with a particular user. For example, the list of services may comprise a list of all previously-provided services and/or a list of all services provided within a recent time window.

Note that a provided list of services may be a default list of services (e.g., associated with the mobile platform and/or user of the mobile platform) or may be an adaptive list of services (e.g., a list that is modified in accordance with past utilization of services, modified in accordance with present and/or future anticipated availability of services, etc.).

Step 110 may comprise presenting a list of services to the user, and provide a user interface mechanism by which the user may select desired services from the list (e.g., by highlighting desired services, checking boxes associated with respective services, checking radio buttons associated with respective alternative services, etc.).

In determining services that are presently available, step 110 may comprise communicating with systems external to the mobile platform (e.g., via wireless communication network) to make such determination. For example, step 110 may comprise traversing a list of potentially available services and contacting respective service providers to determine whether the potentially available services are indeed available. Also for example, step 110 may comprise contacting known service providers (or service brokers) to identify available services and respective available providers for such services.

In determining services that are likely to be present in the future, step 110 may comprise analyzing information in a database regarding services and service providers. For example, in an exemplary scenario in which a user plans to operate the mobile platform in a particular geographical location in the future, step 110 may comprise analyzing service and/or service provider information in a database associated with the particular geographical location. In such a scenario, step 110 may also, for example, comprise communicating with service providers (or representatives thereof) that are known to provide services in the particular geographical location to determine what services will be available to the user.

In determining services that are and/or likely to be available, step 110 may also, for example, comprise determining whether the mobile platform and/or a particular user thereof are authorized to have access to such services. In one exemplary scenario, step 110 may comprise first listing services to which the mobile platform and/or user is presently authorized to access and then listing services that are available if the user (or mobile platform) act to gain authorization to access such services (e.g., by paying for such services). In such an exemplary scenario, user selection of a service to which authorization needs to be gained may result in a user interface being presented to the user by which the user may conduct a business transaction to gain access to such selected service.

Step 110 may also, for example, provide a user interface by which the user may define new services for which the user has never utilized the mobile platform. For example, a user may desire a new service, a geographical area may be provided access to a new service, a user may move the mobile platform to a geographical area that has access to new service, etc. Such new service definition may, for example, comprise entering information regarding a computer application, a service provider identification, authentication and/or authorization information, billing information, etc. Step 110 may then, for example, provide a user interface by which the user may add such a newly defined service to a desired suite of services (e.g., a suite of services presently being defined and/or one or more previously defined suites of services).

Step 110 may comprise providing a user interface by which the user may define new service suites, modify previously defined service suites, select a previously defined service suite and/or delete a previously defined service suite. For example, step 110 may comprise providing a user interface by which a user may assign a unique identifier to a defined service suite. Also for example, step 110 may comprise providing a list of previously-defined service suites from which the user may select a previously-defined service suite (e.g., for utilization, for modification, for deletion, etc.).

In an exemplary scenario, a user may have previously defined one or more suites of services corresponding to a particular geographical location (or region). For example, while on previous work-related travel to a particular region, the user may have defined (or the mobile platform may have automatically defined, based on monitored use activity) a suite of services desired while on work-related travel to a particular region. Also, the user may have defined (or the mobile platform may have automatically defined, based on monitored user activity) a suite of services desired while on personal travel to a particular region. In such a scenario, upon determining (e.g., via user input and/or automatic location determination) that the user is located in such a region (or plans to travel to such a region), step 110 may comprise presenting a list to the user from which to select a desired service suite. Such a list may, for example, include the previously-defined suites associated with the geographical region.

Similarly, a user may have previously defined one or more suites corresponding to particular times of day and/or days of the week. For example, a user may have defined a "work day service suite", "a weekend service suite", "a commuting service suite", a suite for a particular trip duration, etc. In such a scenario, step 110 may comprise presenting a list of service suites to the user that comprises the above-mentioned suites. As mentioned above, presentation of such a list may be triggered by user input, but may also be triggered by a detected time and/or day.

Step 110 may comprise receiving and/or determining prioritization for services in a service suite. For example, step 110 may comprise receiving information from the user that may be utilized to prioritize services in a desired service suite. Also for example, step 110 may comprise determining prioritization for services based on monitored utilization of such services by a user of the mobile platform. Step 110 may utilize such prioritization to order a list of services and/or service suites provided to the user for selection.

Also for example, as will be discussed below, such prioritization may be utilized to organize searching for service providers, to select a set of service providers for providing a service suite, and/or for ordering sets of service providers in a list for presenting to the user for selection. For example, step 110 may comprise arranging information regarding the desired services into data structures that are compatible with commercial enterprises that provide and/or broker suites of services. For example, a service brokerage (e.g., an on-line service brokerage) might specify a particular format for service inquiries. In a scenario where the mobile platform interfaces with a plurality of service providers and/or service brokers to determine the best offer(s) for such service provision, the platform may operate to organize the desired services in a plurality of different respective manners in accordance with formats required and/or preferred by respective service providers and/or brokers.

In general, step 110 may comprise determining a suite of services desired for the mobile platform (e.g., desired by a user of a portable electronic device). Accordingly, the scope of various aspects of the present invention should not be limited by characteristics of any particular manner of performing such determining unless explicitly claimed.

As discussed above, step 110 may comprise providing a user interface by which the mobile platform may interact with the user to determine (or define or select) a suite of services. Step 110 may comprise interacting with a user to define various aspects of such a user interface. For example, step 110 may comprise interacting with a user to determine the manner in which a list of available and/or potentially available services is to be presented to the user. Also for example, step 110 may comprise interacting with a user to determine the conditions under which such a user interface is to be presented to the user.

Once a desired suite of services (or a plurality of such desired service suites) is determined, the exemplary method 100 may comprise determining one or more providers for such services.

The exemplary method 100 may, at step 120, comprise determining one or more optional sets of service providers for providing the determined suite of services. For example, such one or more optional sets of service providers may each comprise one or more service providers. That is, a service suite might be provided by a set of service providers comprising only one service provider or by a set of service providers comprising a plurality of service providers. Note that different sets of service providers may comprise common service providers. Non-limiting examples of such service provider set determination will now be provided.

Step 120 may, for example, comprise communicating with providers of the desired services and/or with commercial enterprises that broker services on behalf of various service providers or groups of service providers. For example, step 120 may comprise establishing communication links between the mobile platform and such entities. Such communication links may be wireless, wired, non-tethered optical, tethered optical, etc. Such communication links may, for example, be formed utilizing one or more of: telecommunication links, data network links, Internet links, WAN/MAN/LAN/PAN links, etc. Such communication links may, for example, be secure (e.g., for protection of personal information, financial transaction information, etc.).

For example, step 120 may comprise communicating information regarding the suite of desired services (or a portion thereof) to a plurality of commercial enterprises associated with providing mobile platform services and receiving back respective price quotes from such commercial enterprises for providing such services. Step 120 may, for example, comprise parsing the suite of desired services into groups (e.g., telecommunication services, Internet services, multimedia services, location-determining services, mapping services, travel assistance services, emergency services, gaming services, etc.) and process each group independently. Step 120 may also, for example, comprise obtaining quotes for the entire service suite as one package.

Step 120 may comprise communicating any of a variety of different types of information with service providers or representatives thereof (e.g., service brokers). For example, such information may include: information describing desired services, information describing available services, pricing information, service quality information, secure communication information, payment information, user account information, mobile platform identity information, information of mobile platform technical details (e.g., operating system, processor, I/O capabilities, communication capabilities, etc.), negotiation information (e.g., a desired or maximum price for a service or suite of services, price information from a service provider's competitors, etc.), etc.

Step 120 may, for example, comprise communicating with service providers (or representatives thereof) to determine whether there are any special offers or discounts that may apply to the desired service package. Step 120 may, for example, comprise negotiating with service providers (or representatives thereof). For example, step 120 may comprise requesting that a particular service provider, set of providers, service broker, etc. match and/or undersell one or more other providers to provide the desired services.

Step 120 may also, for example, comprise communicating with one or more databases (e.g., internal to the mobile platform or external to the mobile platform). Such database(s) may, for example, comprise information correlating particular services with particular respective providers. In such a scenario, step 120 comprise identifying various potential service providers for a particular service (or service suite) from the database, and then comprise communicating with the potential service providers to determine whether such providers are capable of providing desired services, at what quality level, at what expense, etc. Note that such a database may also correlate services and service providers to geographical location, time, date, etc. Thus, for example, step 120 may comprise accessing such database to determine potential service providers for a particular service at a particular location (or in a particular geographical region).

Additionally for example, step 120 may comprise detecting potential service providers in a present operating environment. For example, step 120 may comprise listening for beacon messages associated with communication services, positioning services, security services, financial services, Internet access services, public information services, emergency services, etc. In such a scenario, upon detecting the presence of a potential service provider, step 120 may comprise establishing a communication link with such a potential service provider to determine whether such a potential service provider provides a particular service, to determine all of the services provided by such a potential service provider, etc.

Further for example, step 120 may comprise detecting potential service providers in a future operating environment. For example, step 120 may comprise communicating with service providers (or enterprises associated therewith) to determine whether they provide particular services in a particular geographical area in which a mobile platform will be operating in the future. Step 120 may also, for example, comprise communicating with such service providers to determine quality, expense, necessary mobile platform hardware and/or software configuration, etc. associated with such particular services.

As will be discussed below, various aspects of the present invention may prioritize and/or select a set of service providers for a desired service suite based on various selection criteria. Such selection criteria may, for example and without limitation comprise cost, quality, speed, reliability, security, multimedia quality, media availability, preferred provider(s), non-preferred provider(s), payment methods available, prior experience with particular providers, etc Such selection criteria may, for example, be defined by interacting with a user of the mobile platform.

For example, step 120 may comprise providing a user interface (e.g., a graphical user interface) through which the user can specify characteristics of the suite of services (or providers thereof) that are the most important to the user. For example, a user may indicate that the platform is to obtain the best set of one or more providers to provide a particular suite of services at the lowest cost so long as a particular minimum level of quality and/or reliability is maintained. Also for example, a user may indicate that a particular service provider is never to be used or only to be used if no other options exist.

Step 120 may, for example, comprise interfacing with the user to establish selection criteria for the entire desired suite of services in aggregate or based on individual services or sub-groups of services. For example, the user may require excellent wireless telephony, teleconferencing and multimedia services, while accepting relatively slow email or file-sharing or web-browsing service. Also for example, the user may specify a desire for lowest cost data transfer service and best quality cellular telephony service. Additionally for example, the user may specify a desire for lowest cost VoIP service, the best reliability cellular service below a particular cost level, and at least a minimum level of quality for positioning and mapping services.

Step 120 may also, for example, comprise interfacing with the user to prioritize particular services in the desired suite of services. For example, the user may specify that telephony service is the most important, followed by email service, position-determining services, mapping services, travel assistance services (e.g., airline applications, hotel applications, restaurant applications, etc.), travel agency services, weather services, real-time financial information services, multi-media services, etc. The mobile platform would then know the relative importance between various desired services.

In general, step 120 may comprise determining one or more optional sets of service providers for providing a suite of services (e.g., as determined at step 110). Accordingly, the scope of various aspects of the present invention should not be limited by characteristics of any particular manner of performing such determination unless explicitly claimed.

Once one or more service providing options have been identified (e.g., at step 120) for providing a desired suite of services (e.g., as determined at step 110), the exemplary method may, for example at step 130, comprise selecting a set of service providers for providing the desired suite of services. Non-limiting examples of such selecting will now be provided.

Step 130 may, for example, comprise processing respective information associated with respective sets of service providers (e.g., in light of the user preference information discussed above) to compare the sets of service providers. For example, step 130 may process such information to identify one or more best sets of service providers for providing the desired suite of services.

As discussed previously, the user may define various criteria to be utilized to rank and/or select various sets of one or more service providers (e.g., in addition to or in place of various default criteria). For example, in a scenario where the user has specified that price is the only criterion, the mobile platform may analyze various service providing options to determine the manner in which the user may be provided the desired service suite at the lowest cost. In another example (e.g., in which the user has specified that a minimum service quality threshold is necessary for one or more of the desired services), the mobile platform may analyze various service providing options to determine the most cost-effective set of one or more service providers and/or service broker to provide the desired suite of services while maintaining the desired service quality.

In a further example (e.g., in which the user has specified that the mobile platform find a single source for a desired suite of services), the platform may determine which single source is capable of providing the desired services (e.g., at the lowest price). In a still further example (e.g., in which the platform is flexibly allowed to bundle any number of service providers together), the platform may operate to determine a best service provider for each service of the desired suite of services, and group such identified service providers into a "best" or "recommended" service provider set (e.g., a set of one or more service providers).

Step 130 may, for example, form an ordered (or ranked or prioritized) list of service provider options. As will be discussed below, such a list may be utilized to ultimately select a set of service providers to provide the desired suite of services (e.g., by interacting with a user or by selecting automatically without user interaction).

For example, step 130 may comprise forming a list of service providers and/or service provider groups and/or service brokers. Such list may, for example, be ranked in accordance with any one or more of the various criteria discussed previously. For example, step 130 may comprise forming a list of the best N sets of service providers that the mobile platform found (e.g., at step 120) to provide the desired suite of services (e.g., as determined at step 110) to the user.

Step 130 may comprise selecting a set of service providers by interacting with a user of the mobile platform. For example, step 130 may comprise presenting a list of service provider sets to the user for ultimate selection of a set of one or more service providers (or service broker). Note that in such a scenario, the list presented to the user need not necessarily be ranked, but such ranking may be beneficial. For example, as discussed above, step 130 may comprise forming an ordered list based on user-specified criteria. For example, step 130 may comprise presenting an ordered list in which the set of service providers that best meets the criteria specified for the desired suite of services is placed at the top, and so on. In another example, step 130 may comprise presenting only the determined best service-providing option to the user for user approval.

Note that as described above with regard to a user interface for defining a desired suite of services, step 130 may similarly provide a user interface by which a user may define the manner in which the mobile platform is to interact with the user with regard to selecting a set of service providers. For example, a user may specify the service provider information to be provided to the user and/or the manner in which such information is to be presented to the user.

In an exemplary scenario, the user may indicate to the mobile platform that the platform is to select a plurality of best candidate service providers and/or service provider sets and then present such selections to the user (e.g., in an ordered list) for ultimate selection by the user. In another exemplary scenario, the user may indicate that the mobile platform is to forego interacting with the user upon selection of a best set of one or more service providers and automatically (i.e., without additional interaction) proceed. Such operation may advantageously (as explained in more detail below) allow the platform to select and configure a particular desired service suite while the user is sleeping, busy working on other tasks, or otherwise unavailable.

In interacting with the user of the mobile platform, step 130 may comprise outputting information describing each service provider option to the user. Such information may, for example, be provided to the user to assist the user in making a selection. Such information output to the user may, for example, comprise information of: ranking, cost, quality, reliability, speed, regional accessibility, billing mechanisms, security level, prior experiences with provider(s), etc.

Step 130 may, for example, comprise providing a convenient mechanism by which a user may select a service provider, service provider group and/or service broker for providing the desired services to the user. For example, step 130 may provide for user indicating of a service provider list entry (e.g., via touch screen, cursor movement and selection, numeric input, etc.).

Also for example, step 130 may comprise providing a user interface feature by which a user may specify individual service providers from a set comprising a plurality of service providers. In such an exemplary scenario, step 130 may comprise allowing a user to select a first particular service provider for providing a first group of one or more services, select a second particular service provider for providing a second group of one or more services, etc. In such an exemplary scenario, step 130 may also comprise interacting with such selected service providers, or representatives thereof, to determine whether such a selected combination of service providers is a viable option (e.g., to determine whether such selected service providers can work together to provide the desired services).

As mentioned above, step 130 may comprise determining a set of one or more service providers to provide a desired suite of services automatically (e.g., without interacting with the user, without interacting with the user other than to obtain selection criteria, etc.). In an exemplary scenario, a user may (e.g., at step 110) define a suite of desired services for an upcoming trip (e.g., a business trip, a vacation, etc.). In such scenario, the user may input selection criteria comprising lowest total cost for all services while meeting respective minimum quality goals for each desired service. The user may then perform other non-related activities (even utilizing the mobile platform for other functions) while the mobile platform operates to determine service providing options, select a best service provider option, and (as will be discussed below with regard to step 140) configure the mobile platform to perform the desired suite of services during a desired timeframe.

In general, step 130 may comprise selecting a set of service providers for providing the desired suite of services. Accordingly, the scope of various aspects of the present invention should not be limited by characteristics of any particular manner of performing such selection unless explicitly claimed.

The exemplary method 100 may, for example at step 140, comprise configuring the platform to provide services. For example, step 140 may comprise configuring a mobile platform to utilize a set of one or more service providers (e.g., as determined at step 130) to provide a desired suite of services (e.g., as determined at step 110). Various non-limiting examples of such configuring will now be presented.

For example, step 140 may comprise configuring software/firmware, programming programmable modules of the mobile platform (e.g., communication modules, communication port operation, programmable radios, programmable signal processing modules, programmable secure communication modules, database files, multimedia files, graphics files, mapping files, user interface files, etc.). Such configuring may, for example, comprise configuring signal processing flows (e.g., hardware and/or software signal processing flows) through the platform, selecting and/or configuring particular hardware, selecting and/or configuring processors, decoders, encoders, filters, radios, power managers, etc.

Such configuring may, for example, comprise configuring various communication interface modules that will be utilized to provide the desired services to the user. For example, such communication interface modules may operate to communicate wirelessly utilizing any of a variety of wireless communication protocols (e.g., Bluetooth, IEEE 802.11, IEEE 802.15, IEEE 802.16, IEEE 802.20, GSM/GPRS/EDGE, CEMA/WCDMA/CDMA-2000, LTE, TDMA/PDC, GPS/A-GPS) and/or wired communication protocols.

Step 140 may, for example, comprise interacting with the selected provider(s) (e.g., as selected at step 130) to receive mobile platform settings and/or applications and/or other information (e.g., database information, graphics or map information, security communication information, etc.) that may be utilized to configure the platform to work with the selected providers to provide the desired suite of services. In such a scenario, step 140 may comprise storing application and/or setting information in a memory of the mobile platform.

Such a memory may, for example, comprise volatile and/or non-volatile memory that is generally a permanent to the mobile platform. Such a memory may also, for example, comprise removable memory. As a non-limiting example, such a memory may comprise memory of one or more SIM cards of the mobile platform. For example, a first SIM card may correspond to a first group of one or more service providers, and a second SIM card may correspond to a second group of one or more service providers. In such an exemplary scenario, step 140 may comprise storing configuration information (e.g., setting information, application information, etc.) in one or more of such SIM cards.

In an exemplary scenario, step 140 may comprise communicating with a selected telecommunication service provider to ensure that the mobile platform has the necessary application(s) and/or communication settings to provide the telecommunication service to the user. Also for example, step 140 may comprise communicating with a location/mapping service provider to ensure that the mobile platform has all necessary application(s) and/or setting information to interact with such provider to provide location/mapping services to the user.

In an exemplary scenario, the step 140 may comprise communicating with a selected service provider (e.g., by executing service test requests) to ensure that the service will be available on request by the user with as little burden placed on the user as possible. For example, step 140 may comprise interacting with the service provider(s) by generating test service requests (e.g., test telephone calls, test location-determining tests, test mapping requests, test multimedia requests, test email requests, etc.).

Step 140 may, for example, comprise configuring generic applications to operate with particular service providers. For example, in such a scenario, step 140 may comprise providing a same user interface for a particular service regardless of a selected service provider. For example, a service may be provided by executing a common application for a service while utilizing different networking layers (or configuring a configurable networking layer) for different respective providers of such service.

Step 140 may also, for example, comprise removing non-utilized applications from memory of the mobile platform. For example, after downloading a telecommunication application from a telecommunication service provider and testing operation of such application, the platform may operate to free memory space by removing other telecommunication applications that will not be utilized. A user may, for example, lock particular applications to keep them from being removed. In another example, a selected multimedia service provider may operate with its own proprietary application, which must then be downloaded to the platform. In such example, another multimedia application that will not be utilized for interacting with the selected multimedia service provider may be removed to free up memory space. Alternatively, for example, non-utilized applications and/or configuration information may be moved to different memory (e.g., a removable flash drive, expansion drive, desktop computer or network drive, etc.). Such relocated programming and/or data may then, for example, be conveniently retrieved later.

During the configuration process, step 140 may comprise interacting with the service provider(s) and/or service brokers in any of a variety of manners. For example, step 140 may comprise requesting software and/or setting information downloads. Also for example, step 140 may comprise allowing a service provider to assume control over the mobile platform configuration (e.g., providing service provider (or broker) access to the mobile platform application memory space and/or configuration setting space).

Additionally for example, the step 140 may comprise integrating relatively stable high-layer (e.g., application layer) modules with low-layer (e.g., network layer, transport layer, MAC layer, PHY layer) modules. In such an exemplary scenario, step 140 may comprise seamlessly configuring the mobile platform to provide a particular service to a user while maintaining consistent high layer operation and altering low layer operation unbeknownst to the user. For example, step 140 may comprise configuring such low-layer modules for communicating with a particular service provider to provide data communication necessary for a media-playing application. In such a scenario, a user may utilize the media-playing application in the same manner independent of different low-layer configurations.

Further, various aspects of the present invention may comprise de-configuring the mobile platform for services that are not presently being provided. For example, in a scenario where the mobile platform has been configured to provide a particular suite of services for a particular time window, when such particular time window has passed, the method 100 may comprise de-configuring the platform for such services. For example, the platform may remove particular applications from memory, restore software and/or hardware settings to default values, restrict service provider access to memory resources where such access was previously granted to provide a service, etc.

Still further for example, step 140 may comprise configuring the user interface of the mobile platform to provide the desired services to the user. For example, the mobile platform may present the desired services to the user in the form of icons on the display or menu items, which are in turn linked to the appropriate applications. Such graphical and/or textual elements may be presented to the user in a consistent manner for a particular service regardless of the provider of such service. For example, the platform may always provide the same mechanism to the user for conducting a multimedia session (or, e.g., telecommunication service, mapping service, email service, etc.) regardless of the underlying service provider. Such user interface configuring may, for example, extend to the entire user interface (or a substantial portion thereof) for a particular service. For example, the mobile platform may provide a same look and feel to the user for multimedia presentation regardless of the multimedia service provider. Also for example, the platform may provide the same telephone interface to a user regardless of the selected provider for such service.

Note that step 140 may comprise interacting with the user as-needed during the configuration process. For example, step 140 may comprise interacting with the user to obtain authentication information, financial information, service option information, information regarding the manner in which the user desires services to be provided to the user, etc. Alternatively for example, step 140 may comprise performing such configuring independent of user interaction (e.g., in a situation in which all needed user information is stored in or otherwise accessible to the mobile platform).

In general, step 140 may comprise configuring the mobile platform to provide the desired services. Accordingly, the scope of various aspects of the present invention should not be limited by characteristics of any particular manner of performing such configuring unless explicitly claimed.

The exemplary method 100 may, for example at step 195, comprise performing continued operation. Such continued operating may comprise any of a variety of characteristics, non-limiting examples of which will now be provided. For example, step 195 may comprise looping execution flow of the method 100 back to any previous step (e.g., for additional service identification, for additional service provider determination, etc.). Also for example, step 195 may comprise interacting with a user to determine a service that is immediately desired by the user and then providing such service to the user.

Additionally for example, step 195 may comprise communicating with service providers and/or service brokers to verify mobile platform configuration (e.g., as a background operation before a user requests one of more of the services). For example in an exemplary scenario in which step 140 configured a mobile platform to provide services at a vacation destination, upon arriving at such vacation destination, step 195 may comprise (e.g., automatically without user interaction) communicating with the service providers to verify that the desired services are available to the user.

In general, step 195 may comprise performing continued operation. Accordingly, the scope of various aspects of the invention should not be limited by characteristics of any particular continued operation unless explicitly claimed.

Though the previous discussion focused on determining services, service providers and configuration for a mobile platform, the principals discussed above readily apply to non-mobile platforms as well. For example, the exemplary method 100 (or any portion thereof) may be executed in a commercial electronic product during set-up, during initial and/or subsequent system calibration, etc., even though such commercial electronic product is generally intended to be utilized in a stationary fashion (e.g., in a home entertainment center, office, etc.).

In a non-limiting exemplary scenario, a television set top box may perform such service determination/acquisition/configuration based on a user-specified set of activities. For example, a user may specify desired television services for a period of time (e.g., a desire to watch one or more particular movies, view one or more particular sporting events, view one or more particular pay-per-view events, view a premium channel for a particular television program, etc.). The STB may then (e.g., while the user sleeps or whenever the STB has the processing and/or communication bandwidth to perform such operation) communicate with various service providing and/or service bundling enterprises to determine the best (e.g., cheapest, cheapest at a particular minimum quality level, etc.) set of one or more service providers. Then the STB may, for example, offer the selected best suite of service providers to the user for selection and/or automatically select the best suite of one or more providers and configure the STB accordingly. Such configuration may preferably be performed during off hours (e.g., when the user is not utilizing the STB).

As will be discussed in more detail below, the various aspects of the present invention may be implemented in any of a variety of manners. For example, the various aspects of the present invention may be implemented in hardware and/or a combination of hardware and software. For example, the various aspects of the present invention may be implemented by a processor executing software instructions that are stored on a non-transitory medium. Also for example, the various aspects of the present invention may be implemented by application-specific integrated circuits and/or general-purpose integrated circuits configured to (or directed to) operated in a particular manner. Further for example, various aspects may be implementing utilizing various hardware and/or software modules, which may for example be independent or share various hardware and/or software components with other functionality performed by the mobile platform.

Figure 2:
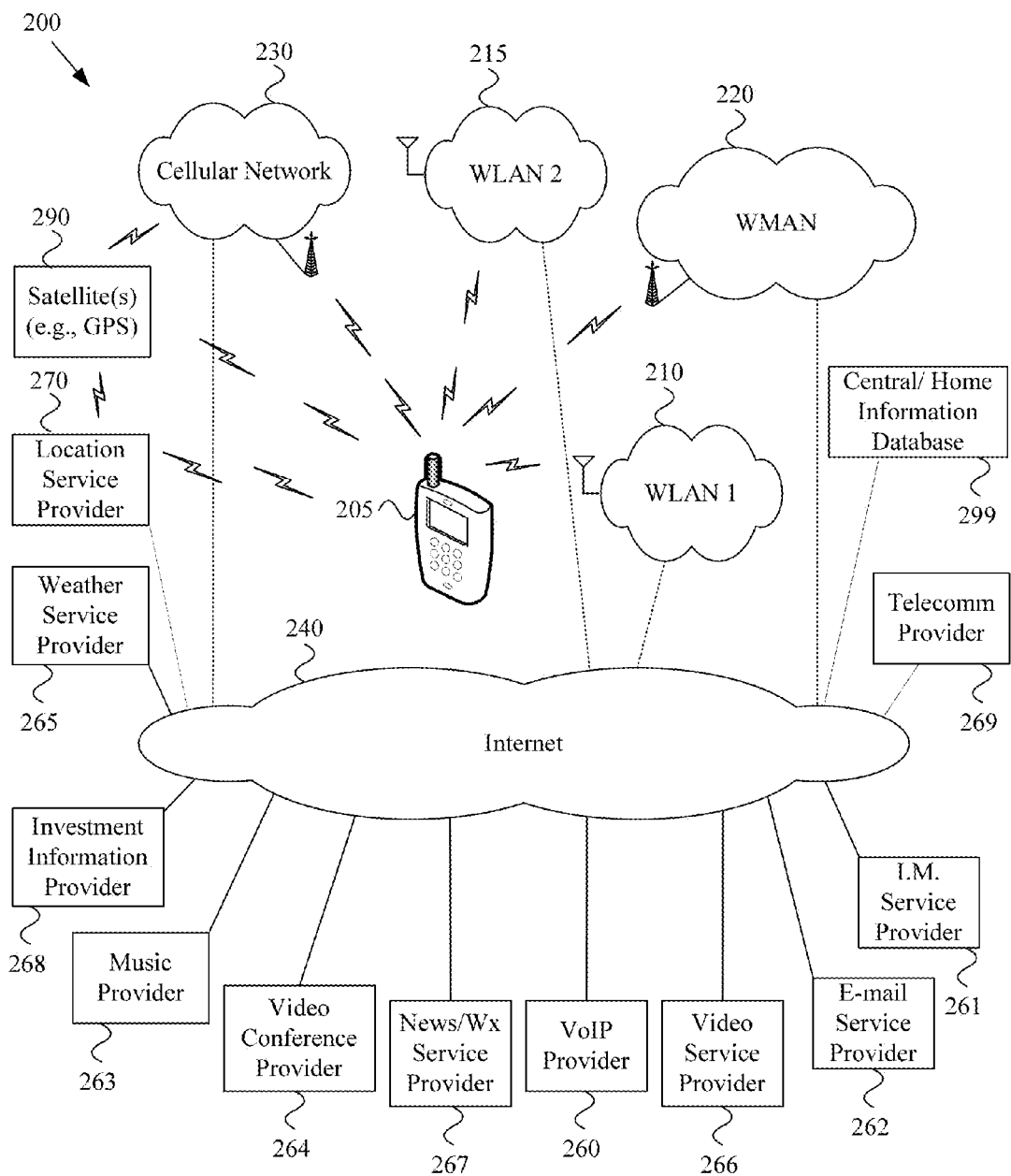
FIG. 2 is a diagram illustrating an exemplary service-providing environment in accordance with various aspects of the present invention.

The previous discussion included discussion of services that may be provided to a user (e.g., by a mobile platform operating in conjunction with a set of one or more service providers). FIG. 2 is a diagram illustrating an exemplary service-providing environment 200 in accordance with various aspects of the present invention.

As discussed above, a suite of one or more desired services may be identified for the mobile platform to provide. The exemplary environment 200 shows non-limiting examples of various services that may be provided to a mobile device (or platform) 205. Such services may, for example, comprise communication services and/or other services.

For example, the environment 200 comprises a plurality of communication networks that may, for example, provide communication services (e.g., voice communication, general data communication, media communication, location information communication, etc.) to the mobile device 205 comprises a first wireless LAN 210, a second wireless LAN 215, a wireless MAN 220, a cellular network 230, a satellite 290, the Internet 240, a wired telecommunication provider 269, etc. The environment 200 also comprises (e.g. communicatively coupled to the Internet 240) an instant messaging service provider 261, an e-mail service provider 262, a video service provider 266, a VoIP service provider 260, a news/weather service provider 267, a video conference service provider 264, a music provider 263, an investment information service provider 268, a weather service provider 265, a location service provider 270, and a central and/or home database access provider 299.

Note that the provision of various services may comprise utilizing one or more service providers. For example and without limitation, providing investment information to the mobile platform 205 may comprise utilizing communication services provided by a Cellular Network 230 provider and an Internet 240 service provider to communicate with the investment information provider 268. Also for example, providing VoIP service to the mobile platform 205 may comprise utilizing communication services provided by the first WLAN 210 operator and Internet 240 service provider to communicate with the VoIP service provider 260.

Figure 3:
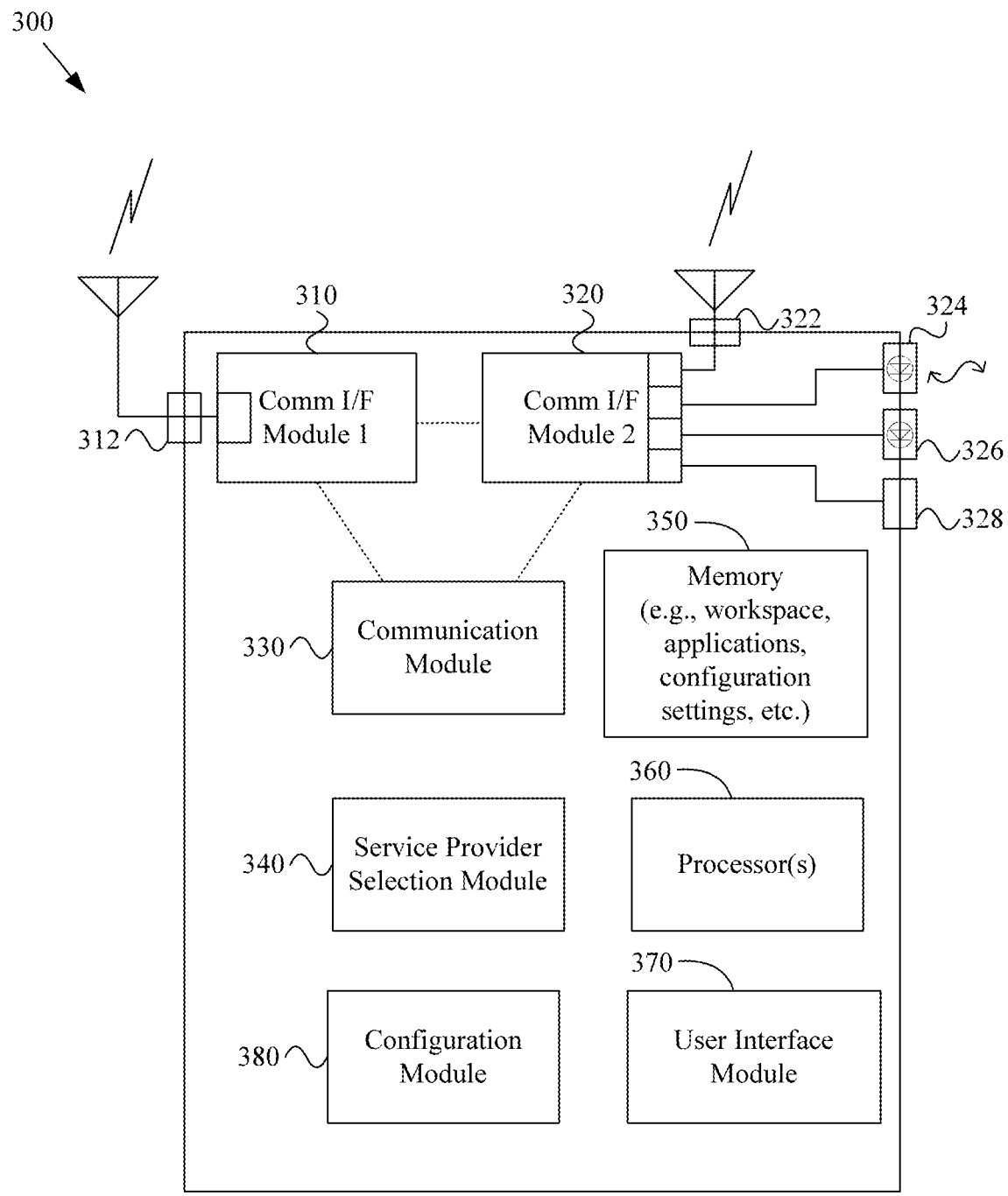
FIG. 3 is a diagram illustrating an exemplary system platform in accordance with various aspects of the present invention.

Turning next to FIG. 3, such figure is a diagram illustrating an exemplary system platform 300 (e.g., a mobile platform) in accordance with various aspects of the present invention. The exemplary platform 300 may, for example, share any or all characteristics with the exemplary mobile device 205 (or platform) illustrated in FIG. 2 and discussed previously. Also for example, as discussed previously, the exemplary platform 300 may share any or all characteristics with a device (or platform) that is generally stationary. The exemplary platform 300 (e.g., various modules thereof) may operate to perform any or all of the functionality discussed previously with regard to the exemplary method 100 illustrated in FIG. 1.

The exemplary platform 300 includes a first communication interface module 310. The first communication interface module 310 may, for example, operate to communicate over any of a variety of communication media and utilizing any of a variety of communication protocols. For example, though the first communication interface module 310 is illustrated coupled to a wireless RF antenna via a wireless port 312, the wireless medium is merely illustrative and non-limiting. The first communication interface module 310 may, for example, operate to communicate with one or more communication networks (e.g., cable television networks, satellite television networks, telecommunication networks, the Internet, local area networks, personal area networks, metropolitan area networks, etc.) via which any of a variety of services may be provided to the mobile platform 300 (or a user thereof). Also for example, the first communication interface module 310 may operate to communicate with any of a variety of service providers via any of a variety of communication networks.

The exemplary platform 300 includes a second communication interface module 320. The second communication interface module 320 may, for example, operate to communicate over any of a variety of communication media and utilizing any of a variety of communication protocols. For example, the second communication interface module 320 may communicate via a wireless RF communication port 322 and antenna, or may communicate via a non-tethered optical communication port 324 (e.g., utilizing laser diodes, photodiodes, etc.). Also for example, the second communication interface module 320 may communicate via a tethered optical communication port 326 (e.g., utilizing a fiber optic cable), or may communicate via a wired communication port 328 (e.g., utilizing coaxial cable, twisted pair, HDMI cable, Ethernet cable, any of a variety of wired component and/or composite video connections, etc.). The second communication interface module 320 may, for example, operate to communicate with one or more communication networks (e.g., cable television networks, satellite television networks, telecommunication networks, the Internet, local area networks, personal area networks, metropolitan area networks, LANs, etc.) via which services may be provided to the platform 300 (or a user thereof). Also for example, the first communication interface module 310 may operate to communicate with any of a variety of service providers via any of a variety of communication networks.

The exemplary platform 300 may also comprise additional communication interface modules, which are not illustrated. Such additional communication interface modules may, for example, share any or all aspects with the first 310 and second 320 communication interface modules discussed above.

The exemplary platform 300 may also comprise a communication module 330. The communication module 330 may, for example, operate to control and/or coordinate operation of the first communication interface module 310 and the second communication interface module 320 (and/or additional communication interface modules as needed). The communication module 330 may, for example, provide a convenient communication interface by which other components of the platform 300 may utilize the first 310 and second 320 communication interface modules. Additionally, for example, in an exemplary scenario where a plurality of communication interface modules are sharing a medium and/or network, or potentially operating in a mutually interfering manner, the communication module 330 may coordinate communications to reduce collisions and/or other interference between the communication interface modules.

The exemplary platform 300 may additionally comprise one or more user interface modules 370. The user interface module(s) 370 may generally operate to provide user interface functionality to a user of the platform 300. For example, and without limitation, the user interface module 370 may operate to provide for user control of any or all standard platform commands (e.g., communication service commands, media providing service commands, gaming commands, location service commands, information service commands, financial service commands, etc.). The user interface module 370 may, for example, operate and/or respond to user commands utilizing user interface features disposed on the platform 300 (e.g., touch screen I/O, buttons, etc.) and may also utilize the communication module 330 (and/or first 310 and second 320 communication interface modules) to communicate with other mobile platforms, a peripheral of the mobile platform 300, etc. Further for example, the user interface module(s) 370 may utilize the communication module 330 (and/or first 310 and/or second 320 communication interface modules) to communicate with other devices or systems to utilize the user interface features of such devices or systems.

As discussed above with regard to at least the method 100 illustrated in FIG. 1, the platform 300 (or various modules thereof) may operate to present information (e.g., data, textual information, image information, moving picture information, audio media, communication audio, etc.) to a user of the platform 300. In such an exemplary scenario, the platform 300 (or various modules thereof) may operate to utilize one or more of the user interface modules 370 to output information on a video display or video display port of the platform 300, output audio information via a speaker or speaker port of the platform 300, etc.

Also, as discussed with regard to at least the method 100 illustrated in FIG. 1, the platform 300 (or various modules thereof) may operate to receive user input regarding services, service providers, service selection criteria, etc. In such an exemplary scenario, the platform 300 may utilize the user interface module(s) 370 to input information received from a user input device (e.g., a touch screen, a keypad, a touch pad, a mouse, a microphone, etc.).

The exemplary platform 300 may comprise one or more processors 360. The processor 360 may, for example, comprise a general purpose processor, digital signal processor, application-specific processor, microcontroller, microprocessor, etc. For example, the processor 360 may operate in accordance with software (or firmware) instructions. As mentioned previously, any or all functionality discussed herein may be performed by a processor executing instructions. For example, though various modules are illustrated as separate blocks or modules in FIG. 3, such illustrative modules, or a portion thereof, may be implemented by the processor 360.

The exemplary platform 300 may comprise one or more memories 350. As discussed above, various aspects may be performed by one or more processors executing instructions. Such instructions may, for example, be stored in the one or more memories 350. Such memory 350 may, for example, comprise characteristics of any of a variety of types of memory. For example and without limitation, such memory 350 may comprise one or more memory chips (e.g., ROM, RAM, EPROM, EEPROM, flash memory, one-time-programmable OTP memory, etc.), hard drive memory, CD memory, DVD memory, etc. Various aspects of the present invention may comprise storing application and/or configuration in one or more removable memory cards, one or more SIM cards, etc., of a mobile platform. Such removable memory cards and/or SIM cards provides additional examples of the memory 350.

The exemplary platform 300 may comprise a service provider selection module 340. Such module(s) 340 may, for example, operate to perform any or all of the service defining and/or service provider selecting functionality discussed previously. For example and without limitation, such module(s) 340 or sub-modules thereof may operate to perform steps 110, 120 and/or 130 of the exemplary method 100 discussed previously. For example, such module(s) 340 or a sub-module thereof may operate to determine a suite of services desired for the platform 300 (e.g., for a portable electronic device comprising the platform 300). Also for example, such module(s) 340 or a sub-module thereof may operate to determine one or more optional sets of service providers for providing the determined suite of services, where each of the determined one or more optional sets of providers comprises one or more service providers. Additionally for example, such module(s) 340 may operate to select a set of service providers from the determined one or more optional sets of service providers to provide the determined suite of services.

In performing such functionality, such module(s) 340 may, for example, operate to utilize the communication modules (310, 320 and 330) of the platform 300 to communicate with entities (e.g., service providers, service brokers, etc.) external to the platform (e.g., via a communication network). Also for example, in performing such functionality, such module(s) 340 may operate to utilize the user interface module(s) 370 to interact with a user of the platform 300 (e.g., to receive information from such user and/or to provide services and/or other information to such user).

The exemplary platform 300 may also comprise one or more platform configuration module(s) 380. Such module(s) 380 may, for example, operate to perform any or all of the configuring functionality discussed previously. For example and without limitation, such module(s) 380 or sub-modules thereof may operate to perform step 140 of the exemplary method 100 discussed previously.

In performing such configuring functionality, such module(s) 380 may, for example, operate to utilize the communication modules (310, 320 and 330) of the platform 300 to communicate with entities (e.g., service providers, service brokers, etc.) external to the platform (e.g., via a communication network) regarding platform configuration. Also for example, in performing such configuring functionality, such module(s) 380 may operate to utilize the user interface module(s) 370 to interact with a user of the platform 300 (e.g., to receive configuration-related information from such user and/or to provide configuration-related information to such user). Also for example, in performing such configuring functionality, such module(s) 380 may operate to interact with the memory 350 of the platform 300 to store and/or retrieve information (e.g., configuration information, application data, authentication information, commercial transaction information, etc.).

Though not illustrated, the exemplary platform 300 may, for example, comprise one or more modules that operate to perform any or all of the initial activity discussed previously with regard to step 105 of the exemplary method 100 and/or perform any or all of the continued processing discussed previously with regard to step 195 of the exemplary method 100. Such modules (e.g., as with the one or more modules 340, 380, 370 and 330) may be performed by the processor(s) 360 executing instructions stored in the memory 350.

Figure 4:
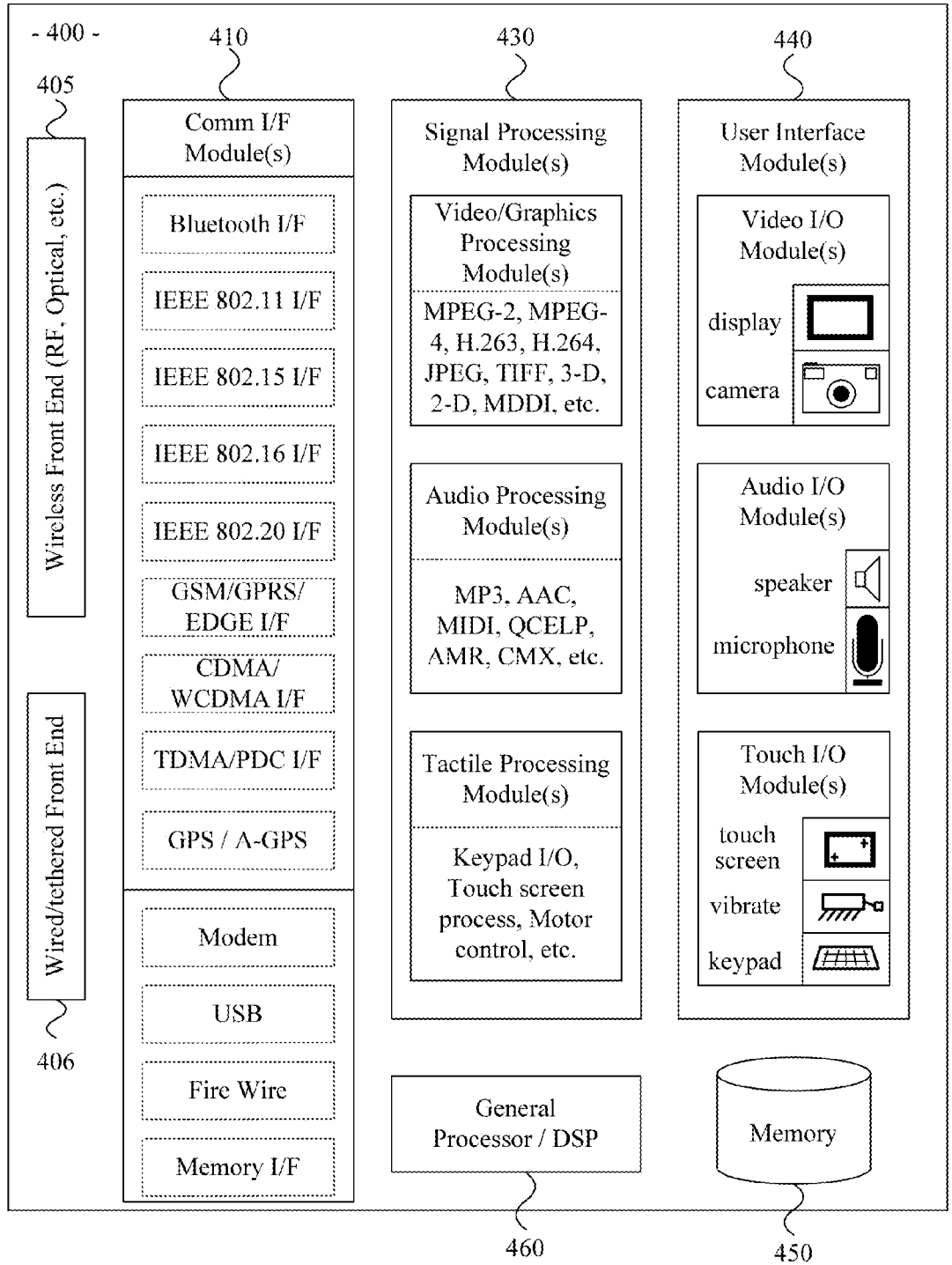
FIG. 4 is a diagram illustrating an exemplary system platform in accordance with various aspects of the present invention.

Turning next to FIG. 4, such figure is a diagram illustrating an exemplary system platform 400 (e.g., a mobile platform) in accordance with various aspects of the present invention The exemplary platform 400 may share any or all aspects with the mobile platform 205 illustrated in FIG. 1 and discussed previously. The exemplary platform 400 may also, for example, share any or all aspects with the platform 300 illustrated in FIG. 3 and discussed previously. For example, the exemplary platform 400 (or various modules thereof) may operate to perform any or all functionality discussed herein with regard to the exemplary method 100 illustrated in FIG. 1 and discussed previously. As with the exemplary platform 300 of FIG. 3, the components of the exemplary platform 400 may be disposed in a single portable electronic device (e.g., a cellular telephone, a personal digital assistant, a handheld computer, a portable gaming device, a personal media player, a camera, etc.).

For example, the exemplary platform 400 comprises at least one processor 460. Such processor(s) 460 may, for example, share any or all characteristics with the processor(s) 360 discussed with regard to FIG. 3. Also for example, the exemplary platform 400 comprises one or more memories 450. Such one or more memories 450 may, for example, share any or all characteristics with the one or more memories 350 discussed with regard to FIG. 3.

Also for example, the platform 400 may comprise any of a variety of user interface module(s) 440. Such user interface module(s) 440 may, for example, share any or all characteristics with the user interface module(s) 370 discussed previously with regard to FIG. 3. For example and without limitation, the user interface module(s) 440 may comprise: a display device, a camera (for still or moving picture acquisition), a speaker, an earphone (e.g., wired or wireless), a microphone, a video screen (e.g., a touch screen), a vibrating mechanism, a keypad, and/or any of a variety of other user interface devices (e.g., a mouse, a trackball, a touch pad, touch screen, light pen, game controlling device, etc.).

The exemplary platform 400 may also, for example, comprise any of a variety of communication modules (405, 406, and 410). Such communication module(s) may, for example, share any or all characteristics with the communication interface module(s) (310, 320 and 330) discussed previously with regard to FIG. 3. For example and without limitation, the communication interface module(s) 410 may comprise: a Bluetooth interface module; an IEEE 802.11, 802.15, 802.16 and/or 802.20 module; any of a variety of cellular telecommunication interface modules (e.g., GSM/GPRS/EDGE, CDMA/CDMA2000/1x-EV-DO, WCDMA/HSDPA/HSUPA, TDMA/PDC, WiMAX, etc.); any of a variety of position-related communication interface modules (e.g., GPS, A-GPS, etc.); any of a variety of wired/tethered communication interface modules (e.g., USB, Fire Wire, RS-232, HDMI, Ethernet, wireline and/or cable modem, etc.); any of a variety of communication interface modules related to communicating with external memory devices; etc. The platform 400 is also illustrated as comprising various wired 406 and/or wireless 405 front-end modules that may, for example, be included in the communication interface modules and/or utilized thereby.

The platform 400 may also comprise any of a variety of signal processing module(s) 430. Such signal processing module(s) 430 may share any or all characteristics with modules of the exemplary platform 400 that perform signal processing. Such signal processing module(s) 430 may, for example, be utilized to assist in processing various types of information discussed previously (e.g., with regard to sensor processing, position determination, video processing, image processing, audio processing, general user interface information data processing, etc.). For example and without limitation, the signal processing module(s) 430 may comprise: video/graphics processing modules (e.g. MPEG-2, MPEG-4, H.263, H.264, JPEG, TIFF, 3-D, 2-D, MDDI, etc.); audio processing modules (e.g., MP3, AAC, MIDI, QCELP, AMR, CMX, etc.); and/or tactile processing modules (e.g., keypad I/O, touch screen processing, motor control, etc.).

In summary, various aspects of the present invention provide a system and method for determining a service provider set of one or more service providers to provide a service suite of one or more user services in a platform (e.g., a mobile device platform) and configuring such platform to utilize such service provider set to provide such service suite to a user. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for configuring a portable electronic device, the method comprising:
   determining a suite of services for the portable electronic device that include cellular serviced instant messaging and Wireless Local Area Network (WLAN) serviced instant messaging;
   determining one or more selectable sets of service providers for providing the determined suite of services;
   selecting a set of service providers from the determined one or more selectable sets of service providers to provide the determined suite of services, the set including a first service provider supporting cellular instant messaging and a second service provider supporting WLAN serviced instant messaging;
   configuring the portable electronic device to utilize the selected set of service providers to provide the determined suite of services;
   initiating cellular serviced instant messaging via the first service provider;
   identifying a change in operating environment; and
   ceasing the cellular serviced instant messaging via the first service provider and initiating the WLAN serviced instant messaging via the second service provider in response to the identified change in operating environment.

2. The method of claim 1, wherein identifying a change in operating environment comprises detecting at least one of:
   a time or date change;
   a geographic location change;
   a change in elevation;

a lack of utilization;
a new user; or
a change in user characteristics.

3. The method of claim 1, wherein determining a suite of services comprises presenting a list of services to a user for user selection of desired services based on operating environment, wherein groups of services and service providers have associated operating environment conditions.

4. The method of claim 1, wherein determining a suite of services comprises presenting a list of previously determined suites of services to a user for user selection.

5. The method of claim 1, wherein determining a suite of services comprises interacting with one or more external systems to identify available services.

6. The method of claim 1, further comprising interacting with a user to define selection criteria.

7. The method of claim 1, wherein selecting a set of service providers comprises presenting a list of the determined one or more selectable sets of service providers to a user for selection.

8. The method of claim 1, wherein determining the one or more selectable sets of service providers comprises communicating with one or more commercial enterprises associated with providing at least one of the determined suite of services.

9. The method of claim 1, wherein configuring the portable electronic device to utilize the selected set of service providers to provide the determined suite of services comprises at least one of:
configuring one or more communication modules of the portable electronic device;
interacting with one or more service providers to receive configuration information for the portable electronic device; or
configuring a user interface of the portable electronic device to provide the determined suite of services.

10. A portable electronic device comprising:
at least one module configured to:
determine a suite of services for the portable electronic device based upon an operating environment that includes cellular serviced instant messaging and Wireless Local Area Network (WLAN) serviced instant messaging;
determine one or more selectable sets of service providers for providing the determined suite of services, where at least one of the determined one or more selectable sets of service providers comprises one or more service providers;
select a set of service providers from the determined one or more selectable sets of service providers to provide the determined suite of services, the set including a first service provider supporting cellular serviced instant messaging and a second service provider servicing WLAN serviced instant messaging; and
configure the portable electronic device to utilize the selected set of service providers to provide the determined suite of services by:
initiating cellular serviced instant messaging via the first service provider;
identifying a change in operating environment; and
ceasing the cellular serviced instant messaging via the first service provider and initiating the WLAN serviced instant messaging via the second service provider in response to the identified change in operating environment.

11. The portable electronic device of claim 10, wherein the at least one module comprises:
a service suite determining module;
a service provider set determining module;
a service provider set selection module; or
a configuration management module.

12. The portable electronic device of claim 10, wherein the at least one module is further configured to:
identify a change in operating environment by detecting at least one of:
a time or date change;
a geographic location;
a change in elevation;
a lack of utilization;
a new user; or
a change in user characteristics; and
perform service determining, service provider determining, service provider selecting, and portable electronic device configuring in response to an identified change in operating environment.

13. The portable electronic device of claim 10, wherein the at least one module is configured to determine a suite of services by:
presenting a list of services to a user for user selection of desired services;
presenting a list of previously determined suites of services to a user for user selection of one or more previously determined suites of services; and
interacting with one or more external systems to identify available services.

14. The portable electronic device of claim 10, where the at least one module is configured to interact with a user to define selection criteria.

15. The portable electronic device of claim 10, wherein the at least one module is configured to determine one or more selectable sets of service providers by searching for a plurality of selectable sets of service providers to provide the determined suite of services.

16. The portable electronic device of claim 10, wherein the at least one module is configured to select a set of service providers by presenting a list of the determined one or more selectable sets of service providers to a user for selection by the user.

17. The portable electronic device of claim 10, wherein the at least one module is configured to determine one or more selectable sets of service providers by communicating with one or more commercial enterprises associated with providing at least one of the determined suite of services.

18. The portable electronic device of claim 10, wherein the at least one module is configured to configure the portable electronic device by programming one or more communication modules of the portable electronic device.

19. The portable electronic device of claim 10, wherein the at least one module is configured to configure the portable electronic device by operating to interact with one or more service providers to receive configuration information for the portable electronic device.

20. The portable electronic device of claim 10, wherein at least one module is configured to configure a user interface of the portable electronic device to provide the determined suite of services.

* * * * *